United States Patent [19]

Pattenden

[11] 4,239,831
[45] Dec. 16, 1980

[54] PROTECTED LUMBER

[75] Inventor: Thomas W. E. Pattenden, Mississauga, Canada

[73] Assignee: Du Pont Canada, Inc., Montreal, Canada

[21] Appl. No.: 41,602

[22] Filed: May 23, 1979

[51] Int. Cl.³ ............................................. B32B 23/02
[52] U.S. Cl. ......................................... 428/193; 52/3; 428/213; 428/218; 428/242; 428/252; 428/263; 428/265
[58] Field of Search .............. 428/242, 245, 247, 263, 428/265, 328, 192, 193, 333, 339, 213, 218, 252; 52/3

[56] References Cited

U.S. PATENT DOCUMENTS 4,043,085  8/1977  Ochiai .................................. 428/265

Primary Examiner—James J. Bell

[57] ABSTRACT

A method for protecting lumber from soiling and warping, during transportation and outdoor storage, is disclosed. Stacks of lumber are covered with a wrapping material comprising a woven oriented polyolefin tape structure coated with a polyolefin containing an aluminum, brass or bronze metallic filler. The metallic filler is present in an amount sufficient to provide a light transmittance through the wrapping material of less than about 30% in the 450 to 700 nm range e.g. in amounts of 0.75 to 4.5% metallic filler when the thickness of the coating is between about 15 and 50 μm.

11 Claims, No Drawings

PROTECTED LUMBER

The present invention relates to a method for protecting stacks of lumber, during transportation and storage outdoors.

During transportation and storge of lumber, especially dressed lumber, it is desirable to protect the lumber from the vagaries of the weather, in order to prevent soiling and/or water staining of the lumber.

It is known to cover lumber with a wrapping material. Examples of such wrapping materials are a woven glass fibre web laminated on both sides to kraft paper, a scrim of woven polyolefin tapes laminated to kraft paper, clear polyethylene film, polyethylene film filled with carbon black pigment, and a scrim of woven polyolefin tapes coated with a layer of polyethylene filled with $TiO_2$. In general the kraft paper laminates tent to be damaged during long distance transportation, which may lead to loss of protection. Lumber wrapped in the aforementioned polyethylene film materials tend to become water stained, mildewed and/or warped.

It is an object of the present invention to provide a method of protecting lumber which tends to overcome the deficiencies of methods of the prior art.

Accordingly the present invention provides a method for protecting lumber comprising covering a stack of lumber on at least its uper, side and end surfaces with a wrapping material selected from the group consisting of (a) a fabric made from woven oriented tapes of polyethylene, said fabric being coated with a layer of polyethylene at least about 15 µm in thickness containing a particulate metallic filler selected from the group consisting of aluminum, brass and bronze, in an amount sufficient to provide a light transmittance through the wrapping material in the 450 to 700 nm wavelength range of less than about 30%, and (b) a fabric made from woven oriented tapes of polypropylene, said fabric being coated with a layer of polypropylene at least about 15 µm in thickness containing a particulate metallic filler selected from the group consisting of aluminum, brass and bronze, in an amount sufficient to provide a light transmittance through the wrapping material in the 450 to 700 nm wavelength range of less than about 30%.

In a preferred embodiment of the method of the present invention the wrapping material has a coating containing aluminum particulate filler, especially aluminum in flake form.

In another embodiment the fabric of woven tapes have a crowdedness of between about 20% and 70% in the weft direction and between about 30% and 100% in the warp direction. Crowdedness is defined as the ratio, expressed as a percentage, of the area of the fabric occupied by either the weft or the warp tapes to the total area of the fabric.

In yet another embodiment the particulate metallic filler is present in an amount sufficient to provide a light transmittance in the 450 to 700 nm wavelength range of less than about 20%.

The present invention also provide a lumber cover having a top panel, two side panels and two end panels, said panels being made of a wrapping material selected from the group consisting of (a) a fabric made from woven oriented tapes of polyethylene, said fabric being coated with a layer of polyethylene at least about 15 µm in thickness containing a particulate metallic filler selected from the group consisting of aluminum, brass and bronze, in an amount sufficient to provide a light transmittance through the wrapping material in the 450 to 700 nm wavelength range of less than about 30%, and (b) a fabric made from woven oriented tapes of polypropylene, said fabric being coated with a layer of polypropylene at least about 15 µm in thickness containing a particulate metallic filler selected from the group consisting of aluminum, brass and bronze, in an amount sufficient to provide a light transmittance through the wrapping material in the 450 to 700 nm wavelength range of less than about 30%, said panels being of a size such that the cover substantially conforms to a rectangular prismoidal stack of lumber.

In a preferred embodiment of the lumber cover of the present invention the adjoining edges of the panels are heat sealed.

In a further embodiment the adjoining edges of the panels are sewn.

In another embodiment the end and top panels are made from a single piece of the wrapping material.

In yet another embodiment the coating of the lumber cover is between about 15 µm and 50 µm and contains aluminum as the particulate metallic filler.

In a further embodiment the wrapping material of the lumber cover is polyethylene.

The present invention further provides a stack of lumber covered on at least its upper, side and end surfaces with a wrapping material selected from the group consisting of (a) a fabric made from woven oriented tapes of polyethylene, said fabric being coated with a layer of polyethylene at least about 15 µm in thickness containing a particulate metallic filler selected from the group consisting of aluminum, brass and bronze in an amount sufficient to provide a light transmittance through the wrapping material in the 450 to 700 nm wavelength range of less than about 30%, and (b) a fabric made from woven oriented tapes of polypropylene said fabric being coated with a layer of polyproplene at least about 15 µm in thickness containing a particulate metallic filler selected from the group consisting of aluminum, brass and bronze in an amount sufficient to provide a light transmittance through the wrapping material in the 450 to 700 nm wavelength range of less than about 30%.

In a preferred embodiment of the stack of lumber of the present invention the coating of the wrapping material contains an aluminum particulate filler, especially aluminum in flake form.

In another embodiment the fabric of woven tapes has a crowdedness of between about 20% and 70% in the weft direction and between about 30% and 100% in the warp direction.

In yet another embodiment the oriented tapes of the fabric are made from a polyethylene, having a density between 0.940 and 0.970 $g/cm^3$, which is a homopolymer of ethylene, a copolymer of ethylene and a $C_3-C_8$ 1-olefin or blends thereof, especially a homopolymer of ethylene and the coating is made from a polyethylene, having a density between 0.910 and 0.945 $g/cm^3$, which is a homopolymer of ethylene, a copolymer of ethylene and a $C_3-C_8$ 1-olefin or blends thereof, especially a copolymer of ethylene and butene-1.

In a further embodiment the coating of the wrapping material has a thickness between about 15 µm and 50 µm, preferably in the range of 20 µm and 30 µm.

It will be understood by those skilled in the art that tapes made from homopolymers of propylene may be oriented and are suitable for making the fabric portion of the wrapping material. It will also be understood that copolymers of propylene e.g. with ethylene are suitable for coating the polypropylene fabric.

The present invention relates to a method for protecting lumber.

It is known that polyethylene containing between 1 and 5% of finely divided $TiO_2$ is opaque to light having a wavelength of less than about 400 nm. However structures of woven oriented polyethylene tapes coated with polyethylene containing finely divided $TiO_2$ tend to allow lumber wrapped therein to "sweat". It is believed that sweating is caused by heating of the lumber to an extent sufficient to cause evaporation of the moisture within the lumber. Retention of the moisture so evaporated within the confines of the wrapping material may lead to mould formation on the surface of the lumber and/or staining.

Replacement of $TiO_2$ in the polyethylene coating with carbon black improves the opacity of the structure to light, by broadening the wavelength spectrum of light which is blocked by the pigment, to a wavelength of less than about 700 nm. While the use of carbon black at a concentration of about 2% prevents substantially all light, having a wavelength of less than about 700 nm, from passing through the material, its use does not appear to materially lessen the problem of sweating. Staining of the lumber does not appear to be as evident when a coating of polyethylene containing carbon black is used, however, but the lumber has a tendency to warp. Such warping is believed to be caused by rapid drying of the boards on the outside of the lumber stack.

Although not wishing to be bound by any theory, it appears that the present invention tends to overcome the problems presented by the prior methods used for wrapping lumber, by minimizing the amount of moisture removed from the lumber and lessening the chances of light-induced staining of the lumber. It appears that, in accordance with the present invention, total opacity to light is not required and that light transmittances in the wavelength range of 450 to 700 nm of less than 30% is sufficient. Light transmittances of less than 20% are preferred, however.

Techniques for manufacturing coated woven polyolefin materials are known. For example, the woven fabric required for the present invention may be woven on a loom having a weft supply bobbin outside the shed of warp tapes, from oriented tapes slit longitudinally from sheets of polyethylene or polypropylene film. The woven fabric may then be transpoted below and past a transversely positioned slot die. As the fabric passes below the slot die, a blend of the coating polyolefin i.e. polyethylene or polypropylene, and the particulate metallic filler is extruded through the slot die onto the fabric, thus forming a thin coating on the woven fabric. The wrapping materials used in the present invention are conveniently woven and coated in widths of between about 245 cm and 275 cm, although there is no reason why other widths could not be used. In the event that material of greater width is required to wrap stacks of lumber, two or more sheets may be cut from a roll of the wrapping material and then may be heat sealed together along their longitudinal edges. Heat sealing may be accomplished by placing one sheet, with its coating facing upwards, longitudinally adjacent to a second sheet, with its coating facing downwards. The longitudinal edges of the two sheets are overlapped so that the coatings are in face-to-face relationship and the coatings then are joined by hot air sealing in a known manner. Further sheets may be heat-sealed to these two in a similar manner, in order to obtain wrapping material of even greater width. In an embodiment of the invention the sheets may be cut to a length equal to twice the height plus the length of the lumber stack to be covered.

For convenience three sheets may be cut longitudinally; two of them into widths corresponding to the height and one of them into a width corresponding to the width of the lumber stack to be covered. The sheets may then be heat sealed as hereinbefore described, or sewn. The longitudinal joints so formed may be used to guide the placement of the wrapping material over the lumber.

A lumber cover may be preformed by folding and sewing the wrapping material into a five-panelled cover i.e. two ends, two sides and a top. Alternatively, the lumber cover may be formed by folding and stapling or otherwise securing the wrapping material after covering the lumber stack.

The wrapping materials used in the present invention are sufficiently durable if the woven fabric portion is loosely woven i.e. is a scrim. It is preferred that the construction of the scrim is sufficient to impart a grab strength to the wrapping material in either the warp of weft directions of at least about 110 N and more particularly between about 175 and 310 N, grab strength being measured by the procedure of ASTM-D1682-64.

Wrapping materials having the desired level of grap strength may be made from a scrim having oriented warp and weft tapes of polyethylene having a density between 0.940 and 0.970 g/cm$^3$ and a coating of polyethylene having a density between 0.910 and 0.945 g/cm$^3$. The scrim may be constructed for example from warp tapes having a width between about 2.0 mm and 3.0 mm and a linear density between about 650 and 1100 dtex and weft tapes having a width between about 2.5 mm and 4.4 mm and a linear density between about 1050 and 1250 dtex, wherein the weave has between about 3.3 and 3.9 ends/cm and 0.9 and 1.5 picks/cm. The coating is preferably between 15 and 50 $\mu$m in thickness and the concentration of aluminum, bronze, or brass in the coating is preferably in the range of 0.75 to 4.5 wt.%.

The particle shape of the metallic pigment is not critical, but flake forms are preferred. The pigment particles used in the present invention need to be of a particle size that is sufficiently small that the extrusion process is not hindered. In general, particles which pass through a 325 mesh TYLER ™ sieve are suitable.

The present invention is illustrated by reference to the following examples:

EXAMPLE 1

The efficacies of an embodiment of the present invention and methods of the prior art were compared with respect to the ability to suppress moisture evolution from lumber.

Samples of wrapping materials, about 33 cm square were taken and weighed. Each sample was wrapped around a weighed 10 cm×5 cm×4 cm block of green ash. The blocks of green ash were cut from a larger block to minimize the variability of moisture content from block to block. The wrapping materials fully enveloped the ash blocks and were stapled thereto. The wrapped blocks were placed about 30.5 cm away from a 250 watt bulb of a sunlamp. Each wrapped block was exposed to six cycles of 30 minute periods of heating, with the sunlamp on, followed by 30 minute periods of cooling, with the sunlamp off. The ambient room temperature was about 10° C. After 12 hours, the ash blocks were weighed after removing from the wrapping material and drying their surfaces with weighed blotting paper. The moist blotting paper was then weighed.

A wrapper, designated "Clear", used for comparison purposes, comprised a scrim of oriented tapes, made from a clear polyethylene having a density of 0.960 g/cm$^3$, in which the warp tapes had a width of 2.5 mm and a linear density of 1067 dtex and the weft tapes had a width of 3.38 mm and a linear density of 1083 dtex and which had 3.55 ends/cm and 1.58 picks/cm, coated with a 25 µm layer of clear polyethylene having a density of 0.923 g/cm$^3$.

A second wrapper, designated "White", also used for comparison purposes, consisted of a scrim, similar to that of the "Clear" wrapper, laminated to a polyethylene film containing about 5% TiO$_2$ and having a thickness of 25 µm.

The wrapper designated "AL", used in the present invention comprised a scrim of oriented tapes made from a clear ethylene homopolymer having a density of 0.960 g/cm$^3$, in which the warp tapes had a width of 2.5 mm and a linear density of 667 dtex and the weft tapes had a width of 4.25 mm and a linear density of 1222 dtex and which had 3.55 ends/cm and 0.94 picks/cm, coated with a 20 µm layer of a mixture of 9 parts of clear polyethylene having a density of 0.923 g/cm$^3$, and one part of a polyethylene and aluminum concentrate. The weft crowdedness of the "AL" wrapper is 40% and the warp crowdedness is 89%.

The polyethylene and aluminum concentrate comprised flake aluminum available from the Canbro Division of International Bronze Powders Ltd. of Valleyfield, Quebec under the trade mark LUXOR 950 in a concentration of 25 wt.% in a polyethylene having a density of 0.917 g/cm$^3$.

The results of the experiments with the "Clear", "White" and "AL" wrapping materials, which are shown in Table I, indicate the effectiveness of the wrapping material of the present invention in reducing the total amount of moisture evolved from the lumber, and of the amount of moisture condensed inside the wrapping material.

TABLE I

| Wrapper | Weight of Wood Before Expt. (g) | Weight of Wood After Expt. (g) | Weight of Wrapper (g) | Weight of Condensed Moisture (g) | Condensed Moisture Evolved (wt %*) | Total Moisture Evolved (wt %**) |
| --- | --- | --- | --- | --- | --- | --- |
| Clear | 254.84 | 251.29 | 6.21 | 0.1780 | 0.070 | 1.41 |
| Clear | 280.93 | 276.71 | 5.36 | 0.2732 | 0.097 | 1.52 |
| White | 269.39 | 265.14 | 5.61 | 0.3644 | 0.135 | 1.60 |
| AL | 307.49 | 305.34 | 3.73 | 0.0415 | 0.013 | 0.70 |

*(Weight of condensed moisture/Weight of wood block before experiment) × 100
**(Difference in weight between wood before and after experiment/Weight of wood after experiment) × 100

EXAMPLE 2

Samples of wrapping materials, about 33 cm square were taken and each sample wrapped around a block of 10 cm×10 cm×5 cm green maple. The blocks of green maple were cut from a larger block to minimize the variability of moisture content from block to block. Maple was chosen because of its light, uniform colour and high moisture content. The wrapping materials fully enveloped the maple blocks and were stapled thereto. The wrapped blocks were placed about 25 cm away from a 250 watt bulb of a sunlamp. Each wrapped block was exposed to about ten cycles of 15 minute periods of heating, with the sunlamp on, followed by 60 minute periods of cooling with the sunlamp off. After completion of the ten cycles each wrapped block was exposed to six hours of natural sunlight in a window facing south. The ambient temperature of the room was about 10° C. Subsequent to exposure to the sunlamp and sunlight the blocks of maple were unwrapped and the amount of water evolved and the extent of staining were noted.

Wrapping materials "Clear", "White" and "AL" of Example 1 were tested. In addition two further wrapping materials were included for comparison purposes. One wrapper, designated "Black" comprised a woven fabric of oriented tapes made from a polyethylene having a density of 0.960 g/cm$^3$ and containing 2 wt.% carbon black pigment, in which the warp tapes had a width of 2.5 mm and a linear density of 889 dtex and the weft tapes a width of 4.37 mm and a linear density of 1211 dtex, and which had 3.54 ends/cm and 2.66 picks/cm, coated on one side with a 25 µm layer of polyethylene having a density of 0.923 g/cm$^3$ and containing 2 wt.% of carbon black pigment, and coated on the other side with a 25 µm layer of polyethylene having a density of 0.923 g/cm$^3$ and containing 4 wt.% of a blue pigment available from Ampacet Corporation under the trade mark AMPACET 16431.

The other wrapper, designated "Paper/Clear" comprised one layer of 35 lb. kraft paper, and a layer of the "Clear" wrapper.

The observations of the tests shown in Table II, are a further indication of the efficacy of the method of the present invention.

TABLE II

| Wrapper | Visual Evaluation of Amount of Water Evolved | Degree of Staining |
| --- | --- | --- |
| Clear | Considerable; large drops visible | Severe on face exposed to sun |
| White | Considerable; large drops visible | Significant on one face only |
| Black | More than all the rest; Wrapper shrank | Very little; some marks on back where water collected |
| Paper/Clear | Considerable; large drops visible | Significant on one face and one edge |
| AL | Less than all the rest; small droplets | Slight, on one edge |

The light transmittances of samples of "Clear", "White", "Paper/Clear", "Black" and "AL" wrapping materials were measured using a UV-visible spectrophotometer. The results are shown in Table III.

TABLE III

| Wrapper | Transmittance in 400–700 nm range |
| --- | --- |
| Clear | 82–86% |
| White | 20–50% |
| Paper/Clear | 0% |
| Black | 0% |
| AL | 26–29% |

EXAMPLE 3

Five stacks of planed and kiln dried mixed pine, spruce and fir lumber, each about 0.6 m×1.2 m×2.4 m were packaged in a wrapping material, designated "AL-1", similar to the "AL" wrapper of Example 1 except that the scrim construction had 3.54 ends/cm and 1.26 picks/cm i.e. having a warp crowdedness of 88% and a weft crowdedness of 54% and the coating was 25 μm thick containing 2.0 wt.% of flake aluminum. Ten similar stacks of lumber were packaged in the "Clear" wrapping material of Example 1. All of the stacks of lumber were wrapped directly after kiln drying. The wrapped stacks of lumber were left in the open for four days during the month of September and on the fifth day all of the wrapped stacks of lumber were transported on an open flat bed truck a distance of 950 km from the Province of Quebec, Canada, to New York State, U.S.A. Upon reaching the destination the moisture condensation on the lumber was checked by hand and visually. There was evidence of moisture condensation present on stacks wrapped in the "Clear" wrapping material, but little or none present on stacks wrapped in the "AL-1" wrapping material.

I claim:

1. A lumber cover having a top panel, two side panels and two end panels, said panels being made of a wrapping material selected from the group consisting of (a) a fabric made from woven oriented tapes of polyethylene, said fabric being coated with a layer of polyethylene at least about 15 μm in thickness containing a particulate metallic filler selected from the group consisting of aluminum, brass and bronze, in an amount sufficient to provide a light transmittance through the wrapping material in the 450 to 700 nm wavelength range of less than about 30%, and (b) a fabric made from woven oriented tapes of polypropylene, said fabric being coated with a layer of polypropylene at least about 15 μm in thickness containing a particulate metallic filler selected from the group consisting of aluminum, brass and bronze, in an amount sufficient to provide a light transmittance through the wrapping material in the 450 to 700 nm wavelength range of less than about 30%, said panels being of a size such that the cover substantially conforms to a rectangular prismoidal stack of lumber.

2. A lumber cover according to claim 1 in which the joining edges of the panels are heat sealed.

3. A lumber cover according to claim 1 in which the joining edges of the panels are sewn.

4. A lumber cover according to claim 1 wherein the end and top panels are made from a single piece of the wrapping material.

5. A lumber cover according to embodiment (a) of claim 1 in which the coating of the wrapping material is between about 15 and 50 μm and the particulate metallic filler is aluminum in a concentration between 0.75 and 4.5 wt.% of the coating.

6. A stack of lumber covered on at least its upper, side and end surfaces with a wrapping material selected from the group consisting of (a) a fabric made from woven oriented tapes of polyethylene, said fabric being coated with a layer of polyethylene at least about 15 μm in thickness containing a particulate metallic filler selected from the group consisting of aluminum, brass and bronze in an amount sufficient to provide a light transmittance through the wrapping material in the 450 to 700 nm wavelength range of less than about 30%, and (b) a fabric made from woven oriented tapes of polypropylene, said fabric being coated with a layer of polypropylene at least about 15 μm in thickness containing a particulate metallic filler selected from the group consisting of aluminum, brass and bronze in an amount sufficient to provide a light transmittance through the wrapping material in the 450 to 700 nm wavelength range of less than about 30%.

7. A stack of lumber according to claim 6 wherein the particulate metallic filler is aluminum.

8. A stack of lumber according to claim 7 wherein the aluminum is in flake form.

9. A stack of lumber according to claim 6 wherein the fabric of woven tapes has a crowdedness of between about 20% and 70% in the weft direction and between about 30% and 100% in the warp direction.

10. A stack of lumber according to claims 6, 7 or 9 wherein the oriented tapes of the fabric are made from a polyethylene, having a density between 0.940 and 0.970 g/cm$^3$, and the coating is made from a polyethylene having a density between 0.910 and 0.945 g/cm$^3$, said polyethylenes being a homopolymer of ethylene, a copolymer of ethylene and a $C_3$-$C_8$ 1-olefin or blends thereof.

11. A stack of lumber according to claim 7 wherein the coating of the wrapping material has a thickness between about 15 μm and 50 μm.

* * * * *